Dec. 22, 1970  L. H. WORKMAN  3,548,465
SAFETY HOOK
Filed April 1, 1969  2 Sheets-Sheet 1
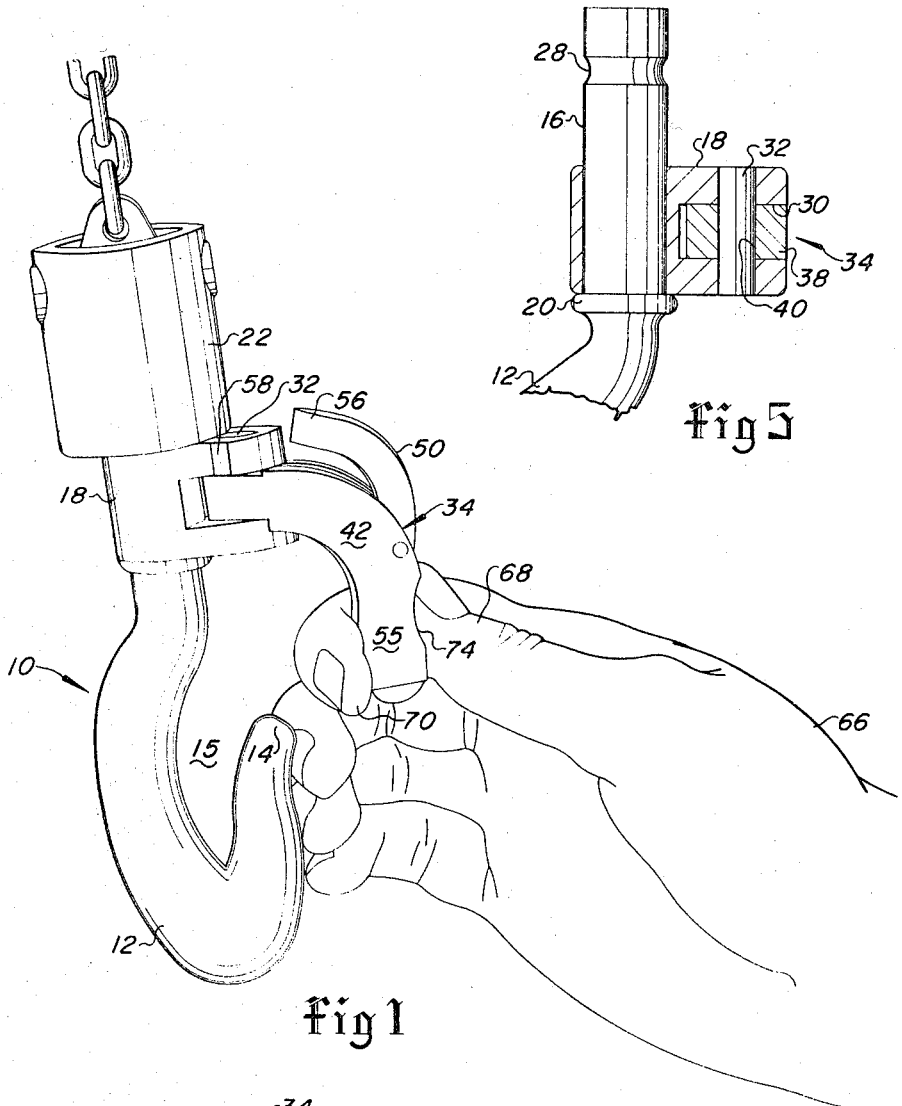
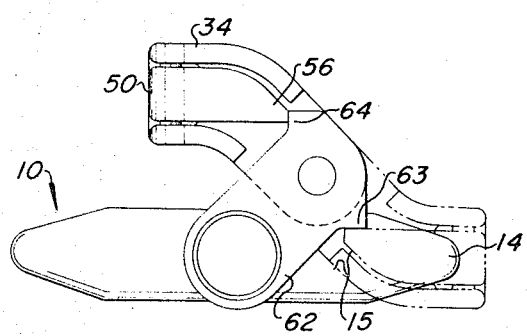
Inventor
Lawrence H. Workman
by Michael E. Martin
agent

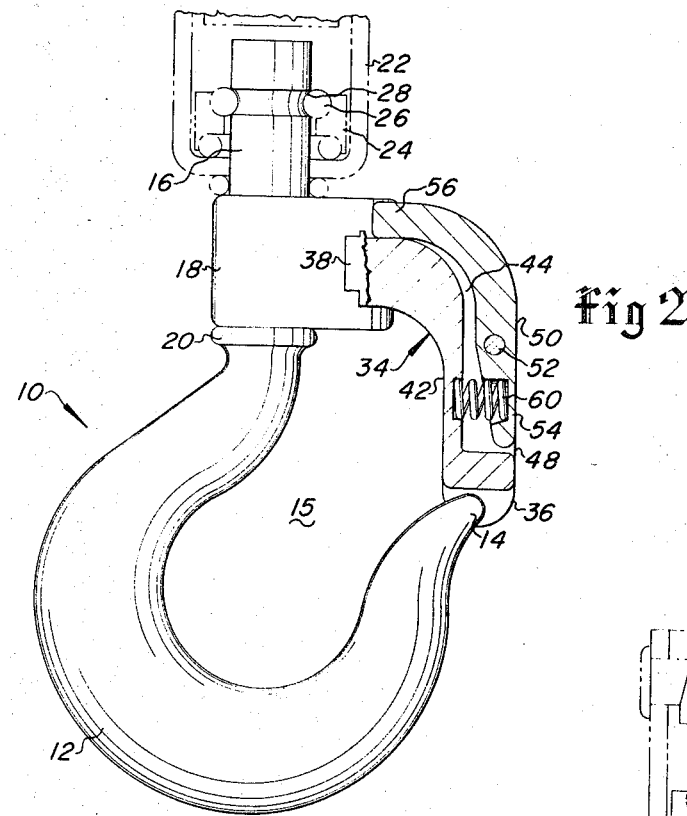
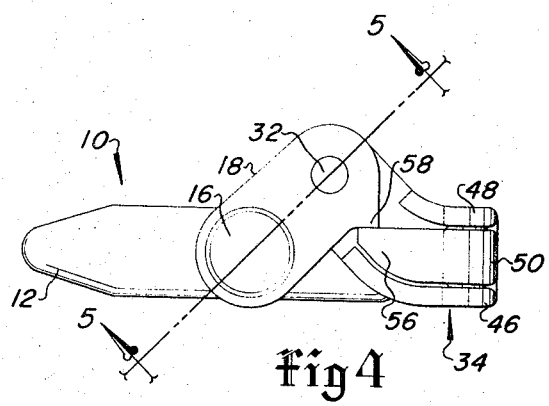
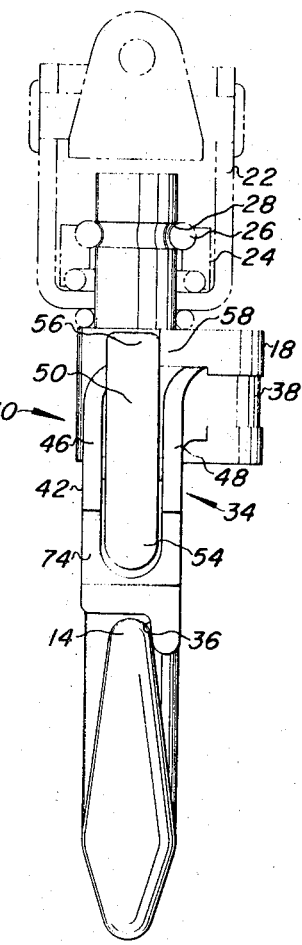

United States Patent Office 3,548,465
Patented Dec. 22, 1970

3,548,465
SAFETY HOOK
Lawrence H. Workman, Muskegon, Mich., assignor to Gardner-Denver Company, Quincy, Ill., a corporation of Delaware
Filed Apr. 1, 1969, Ser. No. 811,821
Int. Cl. A44b 13/00
U.S. Cl. 24—241                                        5 Claims

ABSTRACT OF THE DISCLOSURE

A safety hook having a gate pivotally mounted on the hook to operate as a movable member to close the hook throat. The pivot axis of the gate is parallel to and offset from the axis of the hook shank to provide for one handed opening and closing of the gate. A spring biased latch is located on the throat bridging portion of the gate and is operable to releasably maintain the gate in a closed or open position.

BACKGROUND OF THE INVENTION

In many material handling and hoisting operations involving the use of hooks the load often becomes slack relative to the hook resulting in disengagement of the hook from the sling or lifting eye. Unintentional disengagement of a hook is both wasteful of time and dangerous. Accordingly, devices known as safety hooks are widely used. Safety hooks usually comprise a movable member which bridges the throat of the hook to prevent the aforementioned unintentional disengagement. Examples of safety hooks known in the prior art are disclosed in U.S. Pats. 2,728,967 and 2,853,760 to C. W. Burnham. In the Burnham patents the pivot axis of the movable safety gate is coaxial with the longitudinal axis of the hook shank and the latching devices are located on the side and rear portions of the hub of the gate, respectively.

It is desirable to provide movable gates for safety hooks which can be easily unlatched and opened or closed by one-handed operation. Furthermore, it is desirable to provide a safety hook which includes a gate latching mechanism properly located and of sufficient size to permit ease of operation with the reduced dexterity caused by heavy work gloves or mittens.

SUMMARY OF THE INVENTION

The present invention provides for a safety hook having a gate member for bridging the throat of the hook which is easily operated to be in the closed or open position. By providing a pivot point for the movable safety gate which is offset from the axis of the hook shank one-handed opening of the gate is enhanced. The present invention also provides a safety hook having a gate latch mechanism located on the throat bridging portion of the gate and requiring a minimum of dexterity for operation to unlatch and open the safety gate. The present invention further provides a safety gate latching mechanism which is located in a recessed portion of the safety gate whereby accidental actuation of the latch is minimized.

The present invention still further provides for a safety hook having a gate and latch mechanism which is operable to be latched in the open as well as the closed position whereby intentional disengagement of the hook load is facilitated. These and other provisions of the present invention may be better understood upon reading the description of the preferred embodiment.

BRIEF DESCRIPTION OF THE DRAWINGS

FIG. 1 is a pictorial view of the safety hook of the present invention illustrating the ease of one-hand operation of the safety gate.
FIG. 2 is a side elevation of the safety hook, partially sectioned through the safety gate and latch mechanism.
FIG. 3 is a front elevation of the safety hook.
FIG. 4 is a plan view of the safety hook.
FIG. 5 is a section taken along the line 5—5 of FIG. 4.
FIG. 6 is a plan view of an alternate embodiment of the gate pivot support showing a stop for holding the gate in the open position.

DESCRIPTION OF THE PREFERRED EMBODIMENT

Referring to FIGS. 2, 3, and 4 the numeral 10 generally designates a safety hook according to the present invention. The hook 10 includes a curved body portion 12 terminating at one end in a tip 14 and at the other end in a cylindrical shank 16, see FIG. 5. The hook body 12 and tip 14 form a throat 15 in which the load sling or lifting eye is carried. The hook 10 also includes a lug 18 shown in FIG. 5 as a separate member pressed into place over the shank 16 against a shoulder 20 on the hook body. The lug 18 may be fabricated as a separate member or as part of the hook 10 and is considered to be an integral part thereof. As shown in FIGS. 2, and 3 the hook 10 is adapted to be pivotally supported about the longitudinal axis of the shank 16 by a bail 22 having an antifriction thrust bearing 24. The bail and bearing are retained in assembly with the shank 16 by a ring 26 formed to fit into a groove 28 in the shank. The construction of the bail 22 is but one of numerous ways which the shank 16 may be designed to pivotally support the hook 10 for relatively friction free rotation and forms no part of the present invention.

Referring to FIGS. 4 and 5, the lug 18 projects away from the shank 16 at an angle sufficient to prevent obstruction of the throat 15. The lug 18 includes a clevislike end having a cutout portion 30 and a pin 32 fitted transversely thereacross. The longitudinal or pivot axis of the pin 32 is parallel to the pivot axis of the shank 16.

The pin 32 forms a journal for pivotally supporting a movable member 34, see FIGS. 2 and 3, which forms a gate bridging the throat 15 of the hook 10.

The gate 34 includes a recessed portion 36 at one end for closing over the hook tip 14, and a hub 38 at the opposite end having a bore 40 whereby the gate may be pivotally journaled by the pin 32. The throat bridging portion 42 of the gate 34 includes a recess 44 formed by side walls 46 and 48 which enclose and guard a movable gate latch 50. The latch 50 is pivotally mounted within the recess 44 by a pin 52. The recess 44 provides for enclosing the latch 50 within the envelope of the gate. The latch 50 includes a trigger 54 on one side of the pin 52 and a projection 56 at the opposite end engageable with a complementary projection 58 formed on the lug 18, FIGS. 3 and 4. The latch trigger 54 is adjacent a handle portion 55 of the gate 34, see FIG. 1. A spring 60 operates to bias the latch 50 into the closed position shown in FIGS. 2, 3, and 4. The engagement of the latch projection 56 with the complementary projection 58 on the lug 18 maintains the safety gate 34 in the closed position over the throat 15 to prevent unintentional disengagement of a load carried by the hook.

FIG. 6 illustrates an alternate embodiment of the present invention in which the hook 10 has a lug portion 62 which includes a projection 63 corresponding to projection 58 on the lug portion 18 and a second projection 64 complementary to and engageable by the latch projection 56 to retain the safety gate 34 in the open position. As previously mentioned it is desirable in many operations involving a safety hook to retain the gate in the open position to permit two-handed manipulation of the load on or off the hook or intentional disengagement from a remote operation point. If desired, as disclosed in U.S. Pats. 2,728,967 and 2,853,760, with suitable modification, a torsion coil spring could be employed to be anchored at one end to the stationary pin 32 and at the other end to the hub 38 of the safety gate 34 for biasing the gate to the closed or throat bridging position.

FIG. 1 illustrates the ease with which the safety gate 34 may be opened by one-handed operation. A typical human hand 66 is shown with the thumb 68 operating the latch trigger and cooperating with the forefinger 70 to move the latch projection 56 out of engagement with the complementary projection 58. The gate 34 is easily pivoted to open the throat 15 by bearing the hand against the hook body 12. The ease with which the gate is pivoted open is enhanced by the pivot axis of the gate being offset from the pivot axis of the hook shank, and by the handle portion 55 being located at a point removed from the pivot axis 32 of the gate to provide improved leverage. A slight depression 74 in the side walls of the gate recess also assists the digital actuation of the trigger. Furthermore, the latch trigger is easily actuated even with the reduced dexterity the operator would experience when wearing heavy work gloves or mittens.

The provision of the latch on the throat bridging portion of the gate improves the operating characteristics of the hook and yet the location of the latch in the recess 44 prevents accidental actuation of the latch or damage thereto. As is common practice the hook body, gate, and latch may be made from forged steel, bronze, or aluminum for long life and trouble-free operation.

What is claimed is:
1. A safety hook comprising:
a body having a curved portion terminating in a tip at one end, said body and said tip forming therebetween a throat;
a shank formed on said body having a pivot axis about which said hook may be pivotally supported;
a safety gate pivotally mounted on said hook to be in an open and closed position with respect to said throat; said safety gate including a throat bridging portion and a hub portion having a pivot axis about which said safety gate is pivotally mounted;
a latch member mounted on said throat bridging portion of said safety gate by means of a latch pivot, said latch member including a trigger on one side of said latch pivot and a latch projection on the opposite side of said latch pivot from said trigger, said latch projection being engageable with complementary projection means on said hook body to hold said safety gate in the closed position; and said trigger is adapted to be digitally actuated for moving said latch projection out of engagement with said complementary projection means on said hook body.

2. The invention set forth in claim 1 wherein:
said safety gate includes a recessed portion adapted to receive said latch member substantially within the envelope of said throat bridging portion of said safety gate.

3. The invention set forth in claim 1 wherein:
said hook body includes complementary projection means operable to be engaged by said latch projection whereby said safety gate may be retained in the open position with respect to said throat.

4. The invention set forth in claim 1 wherein:
said latch member includes spring means operably engaged with said trigger to bias said latch projection into engagement with said complementary projection means on said hook body.

5. A safety hook comprising:
a body having a curved portion terminating in a tip at one end, said body and said tip forming therebetween a throat;
a shank formed on said body having a pivot axis about which said hook may be pivotally supported;
a safety gate pivotally mounted on said hook to be in an open and closed position with respect to said throat, said safety gate including a throat bridging portion and latch means on said throat bridging portion operable to retain said safety gate in said closed position, and said safety gate includes a hub portion having a pivot axis about which said safety gate is pivotally mounted on said hook and said pivot axis of said safety gate is spaced from and parallel to said pivot axis of said shank.

References Cited
UNITED STATES PATENTS

| 2,853,760 | 9/1958 | Burnham | 24—241 |
| 3,003,214 | 10/1961 | Geraghty | 24—241 |

LEONARD D. CHRISTIAN, Primary Examiner